(12) United States Patent
Li et al.

(10) Patent No.: US 10,051,611 B2
(45) Date of Patent: Aug. 14, 2018

(54) NETWORK SCHEDULED DEVICE TO DEVICE COMMUNICATION

(71) Applicant: INTEL IP CORPORATION, Santa Clara, CA (US)

(72) Inventors: Qinghua Li, San Ramon, CA (US); Honggang Li, Beijing (CN); Yuan Zhu, Beijing (CN); Huaning Niu, Milpitas, CA (US); Alexey Khoryaev, Nizhny Novgorod (RU)

(73) Assignee: INTEL IP CORPORATION, Santa Clara, CA (US)

( * ) Notice: Subject to any disclaimer, the term of this patent is extended or adjusted under 35 U.S.C. 154(b) by 2 days.

(21) Appl. No.: 14/781,497

(22) PCT Filed: Mar. 28, 2014

(86) PCT No.: PCT/US2014/032251
§ 371 (c)(1),
(2) Date: Sep. 30, 2015

(87) PCT Pub. No.: WO2014/165411
PCT Pub. Date: Oct. 9, 2014

(65) Prior Publication Data
US 2016/0044704 A1    Feb. 11, 2016

Related U.S. Application Data

(60) Provisional application No. 61/808,597, filed on Apr. 4, 2013.

(51) Int. Cl.
*H04W 4/00* (2018.01)
*H04W 72/04* (2009.01)
(Continued)

(52) U.S. Cl.
CPC .......... *H04W 72/0413* (2013.01); *H04B 1/38* (2013.01); *H04B 7/024* (2013.01);
(Continued)

(58) Field of Classification Search
None
See application file for complete search history.

(56) References Cited

U.S. PATENT DOCUMENTS

2011/0223953 A1    9/2011   Lee et al.
2011/0317569 A1    12/2011  Kneckt et al.
(Continued)

FOREIGN PATENT DOCUMENTS

WO    2012019348 A1    2/2012
WO    2012034269 A1    3/2012

OTHER PUBLICATIONS

LG Electronics; "Considerations for D2D Proximity Services Evaluation"; 3GPP TSG RAN WG1 R1-130217, Discussion and Decision; (Jan. 28-Feb. 1, 2013); 6 pages; Meeting #72, Agenda 7.3.7; St. Julian's, Malta.
(Continued)

*Primary Examiner* — Phirin Sam
(74) *Attorney, Agent, or Firm* — Thorpe North & Western

(57) ABSTRACT

A technology for device to device (D2D) communication scheduling is disclosed. A D2D device can be synchronized with a base station of a cellular system. A sub-frame symbol boundary can be identified in the cellular system for the D2D communication. A resource for a D2D communication can be allocated from the D2D device to another D2D device within the sub-frame boundary of the cellular system. The D2D device can be switched to perform a D2D communication with another D2D device in proximity with the D2D device, wherein the other D2D device is substantially synchronized with the base station of the cellular system. The
(Continued)

D2D device can communicate with the other D2D device within at least one symbol boundary time within the selected subframe.

21 Claims, 11 Drawing Sheets

(51) Int. Cl.
| | |
|---|---|
| H04W 4/70 | (2018.01) |
| H04W 76/12 | (2018.01) |
| H04L 5/00 | (2006.01) |
| H04B 7/024 | (2017.01) |
| H04W 24/02 | (2009.01) |
| H04W 74/08 | (2009.01) |
| H04W 36/30 | (2009.01) |
| H04B 1/38 | (2015.01) |
| H04W 76/00 | (2018.01) |
| H04W 76/02 | (2009.01) |
| H04W 24/08 | (2009.01) |
| H04L 12/26 | (2006.01) |
| H04W 68/02 | (2009.01) |
| H04L 12/18 | (2006.01) |
| H04L 29/06 | (2006.01) |
| H04L 29/08 | (2006.01) |
| H04W 8/00 | (2009.01) |
| H04W 56/00 | (2009.01) |
| H04W 72/12 | (2009.01) |
| H04L 5/14 | (2006.01) |
| H04W 36/00 | (2009.01) |
| H04L 1/18 | (2006.01) |
| H04W 76/38 | (2018.01) |
| H04W 76/22 | (2018.01) |
| H04B 7/0456 | (2017.01) |
| H04B 7/06 | (2006.01) |
| H04W 76/04 | (2009.01) |
| H04W 76/06 | (2009.01) |
| H04W 84/12 | (2009.01) |
| H04W 84/04 | (2009.01) |
| H04W 88/02 | (2009.01) |
| H04W 92/20 | (2009.01) |
| H04W 88/08 | (2009.01) |
| H04W 36/38 | (2009.01) |
| H04W 36/14 | (2009.01) |
| H04W 36/36 | (2009.01) |

(52) U.S. Cl.
CPC .......... *H04L 1/1854* (2013.01); *H04L 5/0053* (2013.01); *H04L 5/0055* (2013.01); *H04L 5/0094* (2013.01); *H04L 5/14* (2013.01); *H04L 12/18* (2013.01); *H04L 43/0823* (2013.01); *H04L 65/1016* (2013.01); *H04L 65/4076* (2013.01); *H04L 65/4092* (2013.01); *H04L 67/02* (2013.01); *H04L 67/1076* (2013.01); *H04W 4/005* (2013.01); *H04W 4/70* (2018.02); *H04W 8/005* (2013.01); *H04W 24/02* (2013.01); *H04W 24/08* (2013.01); *H04W 36/0088* (2013.01); *H04W 36/0094* (2013.01); *H04W 36/30* (2013.01); *H04W 56/001* (2013.01); *H04W 68/02* (2013.01); *H04W 72/042* (2013.01); *H04W 72/048* (2013.01); *H04W 72/0446* (2013.01); *H04W 72/0486* (2013.01); *H04W 72/1215* (2013.01); *H04W 72/1263* (2013.01); *H04W 74/0808* (2013.01); *H04W 76/00* (2013.01); *H04W 76/022* (2013.01); *H04W 76/12* (2018.02); *H04B 7/0456* (2013.01); *H04B 7/0639* (2013.01); *H04L 5/0007* (2013.01); *H04L 65/105* (2013.01); *H04L 65/1006* (2013.01); *H04W 36/14* (2013.01); *H04W 36/36* (2013.01); *H04W 36/38* (2013.01); *H04W 76/041* (2013.01); *H04W 76/068* (2013.01); *H04W 76/22* (2018.02); *H04W 76/38* (2018.02); *H04W 84/045* (2013.01); *H04W 84/12* (2013.01); *H04W 88/02* (2013.01); *H04W 88/08* (2013.01); *H04W 92/20* (2013.01)

(56) References Cited

U.S. PATENT DOCUMENTS

| | | | |
|---|---|---|---|
| 2012/0106517 A1 | 5/2012 | Charbit et al. | |
| 2012/0195328 A1* | 8/2012 | Otsuka | H04L 7/041 370/478 |
| 2012/0294163 A1* | 11/2012 | Turtinen | H04W 72/042 370/252 |
| 2013/0039324 A1 | 2/2013 | Kwon et al. | |
| 2013/0170468 A1* | 7/2013 | Baker | H04W 72/085 370/330 |
| 2013/0272262 A1* | 10/2013 | Li | H04W 28/02 370/330 |
| 2013/0288608 A1* | 10/2013 | Fwu | H04W 72/02 455/63.1 |
| 2013/0315152 A1* | 11/2013 | Ratasuk | H04W 76/023 370/329 |
| 2014/0126490 A1* | 5/2014 | Chen | H04L 5/0048 370/329 |
| 2014/0185530 A1* | 7/2014 | Kuchibhotla | H04W 76/023 370/329 |
| 2014/0273862 A1* | 9/2014 | Maaref | H04J 11/0026 455/63.1 |
| 2014/0342747 A1* | 11/2014 | Lee | H04L 5/0053 455/450 |
| 2015/0319724 A1* | 11/2015 | Chae | H04W 8/005 370/315 |
| 2016/0029331 A1* | 1/2016 | Seo | H04W 56/002 370/350 |
| 2016/0029333 A1* | 1/2016 | Seo | H04W 76/14 370/350 |
| 2016/0374068 A1* | 12/2016 | Kim | H04W 72/04 |
| 2017/0164383 A1* | 6/2017 | Seo | H04W 72/1215 |
| 2017/0347386 A1* | 11/2017 | Seo | H04W 72/042 |

OTHER PUBLICATIONS

3GPP TSG RAN WG1 Meeting #72: R1-130271; Considerations for D2D Proximity Services Evaluation; Jan. 28, through Feb. 1, 2013; St. Julian's, Malta.

3GPP TSG RAN WG1 Meeting #72: R1-130502; LTE Device to Device Prosimity Services—Deployment Scenarios; Jan. 28, through Feb. 1, 2013; St. Julian's, Malta.

3GPP TSG RAN WG1 Meeting #72: R1-130236; Recommendations for D2D evaluation methodology and assumptions; Jan. 28 through Feb. 1, 2013; St. Julian's, Malta.

Zulhasnine et al.; Efficient Resource Allocation for Device-to-Device Communication Underlaying LTE Network; IEEE 6th National Conference on Wireless and Mobile Computing; 2010.

Lei et al; Operator Controlled Device-to-Device Communications in LTD-Advanced Networks; IEEE Wireless Communications; Jun. 2012.

* cited by examiner

NETWORK SCHEDULED DEVICE TO DEVICE COMMUNICATION

RELATED APPLICATIONS

This application claims the benefit of and hereby incorporates by reference U.S. Provisional Patent Application Ser. No. 61/808,597, filed Apr. 4, 2013.

BACKGROUND

Users of wireless and mobile networking technologies are increasingly using their mobile devices to send and receive data as well as communicate. With increased data communications on wireless networks the strain on the limited bandwidth and system resources that are available for wireless telecommunications is also increasing. To handle the increasing amount of wireless services to an increasing numbers of users, an efficient use of the available radio network resources has become important.

To handle the increasing amount of wireless services to an increasing numbers of users, efficient use of the available radio network resources has become important. Device to device (D2D) communications allows mobile users to directly communicate with each other, thereby reducing the load on the radio network resources. The D2D communication can occur when closely located devices are enabled to communicate with each other directly instead of using a conventional communications links such as a Wi-Fi or cellular communications system. Some types of D2D communications are enhanced by cellular communication systems, thereby requiring the D2D communications device to be within range of a cellular communications system, such as an enhanced node B (eNB).

One way to increase efficiency and better resource management of the D2D communications system and reduce interference between the D2D communications system and the cellular communications system is to synchronize the D2D communications with the cellular network.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
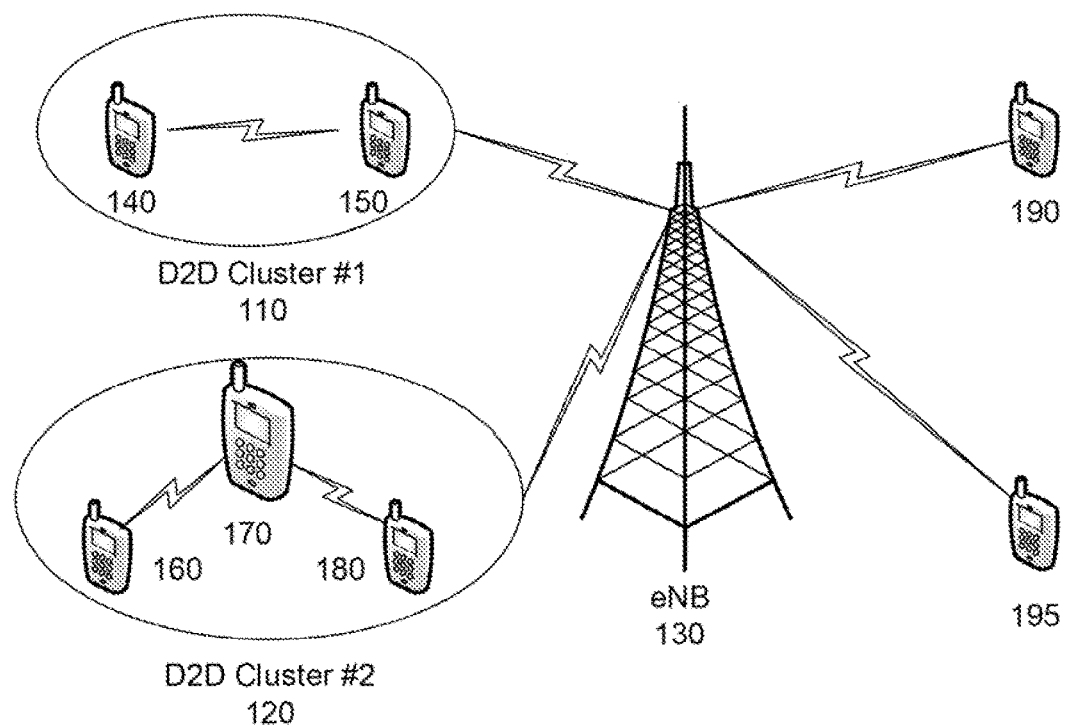
FIG. 1 illustrates several of the different communications environments that may provide support for D2D communications in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

In a D2D communications system, multiple mobile equipment devices, such as a user equipment (UE), can be configured to directly communicate with each other and/or communicate with a cellular communications system, such as an enhanced node B (eNB).

The cellular communications system can be comprised of one or more cellular network nodes and one or more Institute of Electrical and Electronics Engineers (IEEE) 802.11-2012 configured access points (APs). In one embodiment, the one or more cellular networks may be 3rd generation partnership project (3GPP) long term evolution (LTE) Rel. 8, 9, 10, 11, or 12 networks and/or IEEE 802.16p, 802.16n, 802.16m-2011, 802.16h-2010, 802.16j-2009, 802.16-2009 networks. In one embodiment, the cellular communications network can be comprised of a multiple radio access technology (multi-RAT) heterogeneous network (HetNet), where the RATs used may include multiple different RATs, such as 3GPP RATs, wireless local area network (WLAN) RATs, mm-wave RATs, 60 GHz RATs, etc.

A D2D communications system can provide support for a plurality of different D2D communications environments. FIG. 1 illustrates several of the different communications environments that may provide support for D2D communications. One example of the communications environment depicted in FIG. 1 is D2D cluster #1 110. D2D cluster #1 110 depicts direct communication among UEs, such as two UEs. For D2D cluster #1 110, UE 140 and UE 150 are in direct communication with each other and the D2D cluster #1 110 is also in communication with a cellular communications system, such as eNB 130. In one embodiment, D2D cluster #1 110 may be assisted by the eNB 130 in communicating data or information in a cellular network. In another embodiment, D2D cluster #1 110 may be assisted by the eNB 130 in synchronizing or setting up the direct D2D communications between UE 140 and UE 150.

In another example, D2D cluster #2 120 depicts a plurality of D2D devices such as UEs 160, 170, and 180 that are in D2D communications with each other. In one embodiment, UE 160 and UE 180 are in direct communication with UE 170. In another embodiment, UE 160 and UE 180 may be in indirect D2D communication with each other via an intermediary D2D communications device, such as UE 170. The D2D cluster #2 120 can also be in communication with eNB 130. In one embodiment, D2D cluster #2 120 may be assisted by the eNB 130 in communicating data or information in a cellular network. In another embodiment, D2D cluster #2 120 may be assisted by the eNB 130 in synchronizing or assisting in setting up the direct or indirect D2D communications between UE 160, UE 170, and/or UE 180.

In another example of a communications environment in FIG. 1, UEs, such as UEs 190, may be in direct communication with the eNB 130 and/or in indirect D2D communications with other D2D devices in the cellular network. In one example, one UE 190 may be in indirect D2D communication with another UE 190 via the eNB 130. In another example, UE 190 may be in indirect D2D communication with D2D cluster #1 110 and/or D2D cluster #2 120. In another example, D2D cluster #1 110 may be in indirect D2D communications with D2D cluster #2 120.

Figure 2:
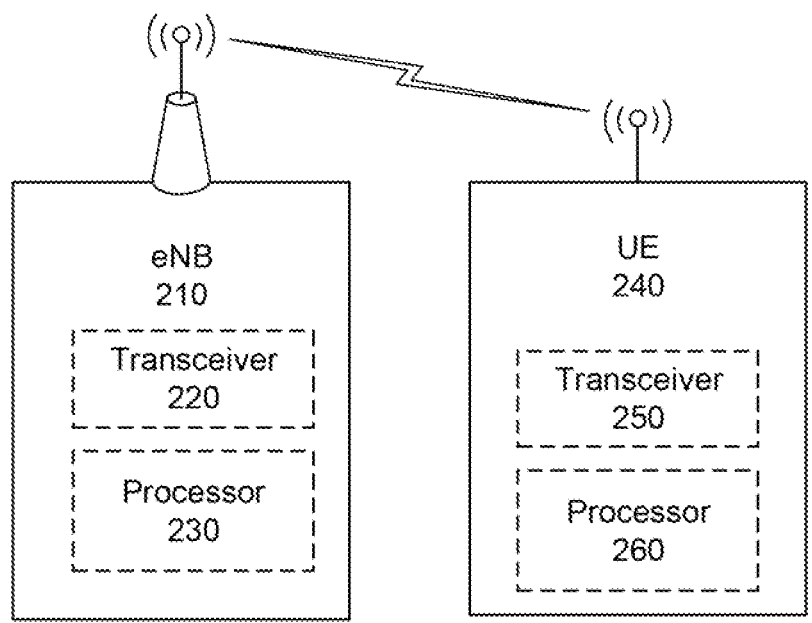
FIG. 2 illustrates one embodiment of a network assisted D2D communications system in accordance with an example.

FIG. 2 illustrates that in one embodiment of a network assisted D2D communications system, an eNB 210 comprises a transceiver 220 and a computer processor 230. FIG. 2 also illustrates that the UE 240 can comprise of a transceiver 250 and a computer processor 260.

Figure 3:
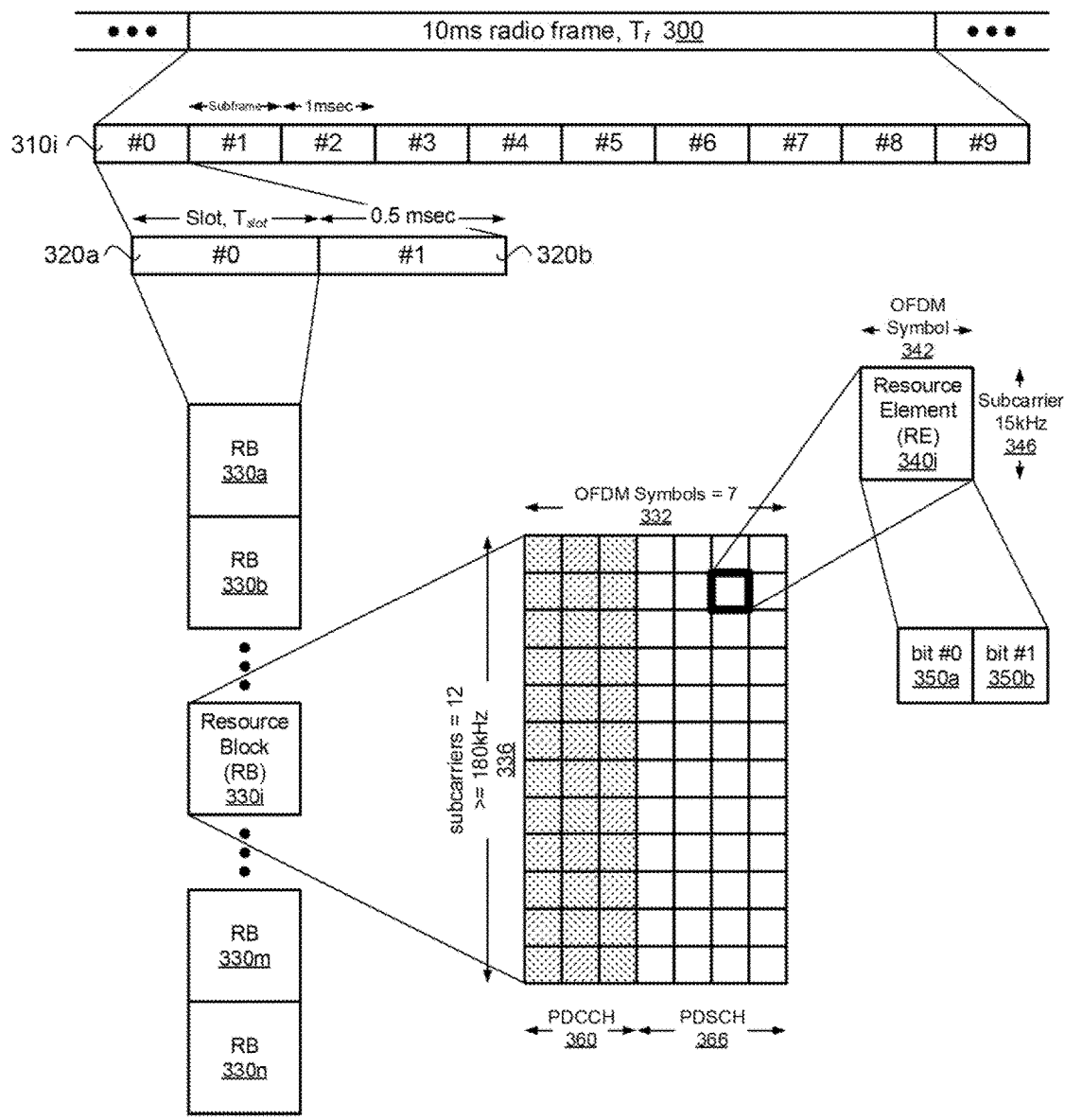
FIG. 3 illustrates a downlink radio frame structure in accordance with an example.

D2D communication systems can provide mobile device users with a better quality of service (QoS), new applications, and increased mobility support. To increase efficiency and reduce interference, UEs in a D2D system can synchronize their D2D communications. In one example, the UEs can synchronize with the D2D network using a radio frame structure, transmitted on a physical (PHY) layer in a downlink or uplink transmission between an eNB and a UE. In one embodiment, the D2D communications may occur on a licensed band for communications. In one embodiment a 3GPP LTE frame structure is used for the synchronization, as illustrated in FIG. 3. In one embodiment, the one or more cellular networks may a 3GPP LTE Rel. 8, 9, 10, 11, or 12 network and/or a IEEE 802.16p, 802.16n, 802.16m-2011, 802.16h-2010, 802.16j-2009, 802.16-2009.

FIG. 3 illustrates a downlink radio frame structure. In another embodiment, an uplink radio frame structure could similarly be used. In the example of the downlink radio frame structure, a radio frame 300 of a signal used to transmit the data can be configured to have a duration, Tf, of 10 milliseconds (ms). Each radio frame can be segmented or divided into ten subframes 310*i* that are each 1 ms long. Each subframe can be further subdivided into two slots 320*a* and 320*b*, each with a duration, Tslot, of 0.5 ms. The first slot (#0) 320*a* can include a legacy physical downlink control channel (PDCCH) 360 and/or a PDSCH 366, and the second slot (#1) 320*b* can include data transmitted using the PDSCH.

Each slot for a component carrier (CC) used by the node and the wireless device can include multiple RBs 330*a*, 330*b*, 330*i*, 330*m*, and 330*n* based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first OFDM symbols in each subframe or physical RB (PRB), when a legacy PDCCH is used. The remaining 11 to 13 OFDM symbols (or 14 OFDM symbols, when legacy PDCCH is not used) in the subframe may be allocated to the PDSCH for data (for short or normal cyclic prefix).

The control region can include physical control format indicator channel (PCFICH), physical hybrid automatic repeat request (hybrid-ARQ) indicator channel (PHICH), and the PDCCH. The control region has a flexible control design to avoid unnecessary overhead. The number of OFDM symbols in the control region used for the PDCCH can be determined by the control channel format indicator (CFI) transmitted in the physical control format indicator channel (PCFICH). The PCFICH can be located in the first OFDM symbol of each subframe. The PCFICH and PHICH can have priority over the PDCCH, so the PCFICH and PHICH are scheduled prior to the PDCCH.

Each RB (physical RB or PRB) 330*i* can include 12-15 kHz subcarriers 336 (on the frequency axis) and 6 or 7 orthogonal frequency-division multiplexing (OFDM) symbols 332 (on the time axis) per slot. The RB can use seven OFDM symbols if a short or normal cyclic prefix is employed. The RB can use six OFDM symbols if an extended cyclic prefix is used. The RB can be mapped to 84 resource elements (REs) 340*i* using short or normal cyclic prefixing, or the RB can be mapped to 72 REs (not shown) using extended cyclic prefixing. The RE can be a unit of one OFDM symbol 342 by one subcarrier (i.e., 15 kHz) 346.

Each RE can transmit two bits 350*a* and 350*b* of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNB to the UE, or the RB can be configured for an uplink transmission from the UE to the eNB.

While communicating with each other using D2D communications, each UE may need to switch between transmission and reception modes for sending and receiving messages, respectively. In one embodiment, D2D communications can be performed during the uplink band communications period of a cellular network. In this embodiment, the sequential switching between the transmission and reception modes can enable the UEs to perform D2D communications during the uplink band communications period of a cellular network. During the downlink band communication period, the eNB transmits with a relatively high power relative to the signals transmitted by UEs. This high power signal can cause significant interference to a UE that is transmitting with a lower power signal. However, during the uplink band communication period, only other UEs transmit with the lower power signals. Transmitting during the uplink communication band can enable D2D communications to occur with significantly lower amounts of interference.

In one embodiment, synchronization may occur between a plurality of UEs. To enable switching between a plurality of UEs, a transmission mode and reception mode may be used. In one embodiment, switching between transmission and reception modes in D2D communications involves both a transmitter UE (Tx UE) and a receiver UE (Rx UE).

There may be a number of different switching and synchronization schemes for D2D communications. In one embodiment, the D2D communications between D2D UEs can occur independent of a cellular system. In this embodiment, the D2D UEs can synchronize with each other using methods independent of a cellular system, such as using the preambles of data packets sent between the D2D UEs to synchronize the D2D communications. In one embodiment, the D2D communications can be sent on a licensed portion of the radio frequency spectrum.

In another embodiment, the UE(s) and/or eNB(s) for D2D communications can operate with the assistance of a cellular system. In this embodiment, timing and synchronization of the cellular system and/or the eNB can be used by a D2D UE in performing timing and synchronization of communications between D2D UEs. In one embodiment, the switching between transmission and reception modes for a D2D UE can occur at or around a symbol boundary of the cellular system. One advantage of performing the switching between transmission and reception modes at or around a symbol boundary of the cellular system is the ease of hardware implementation and interference management. In one embodiment, the D2D communications that are assisted by a cellular system can occur on a licensed portion of the radio spectrum.

Figure 4:
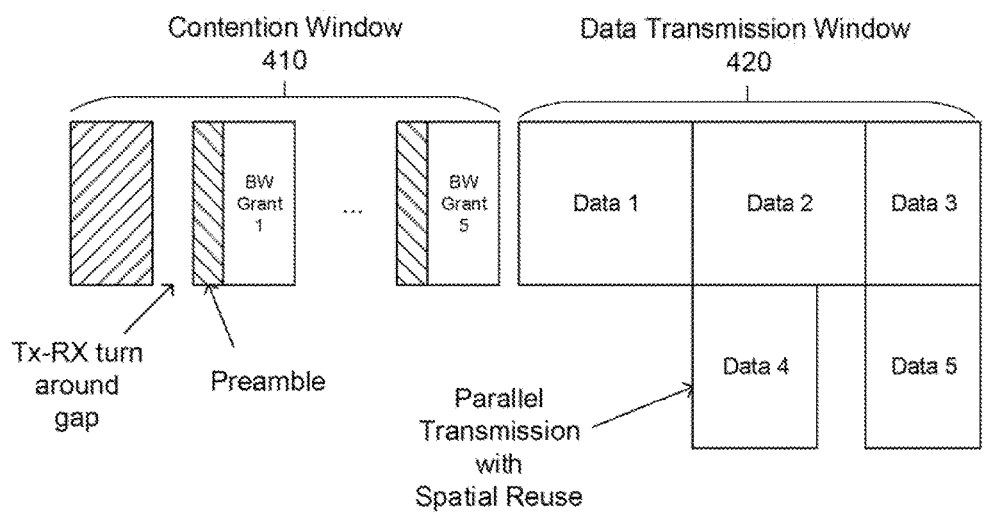
FIG. 4 illustrates a D2D channel access scheme in accordance with an example.

FIG. 4 illustrates a D2D channel access scheme. In FIG. 4, the D2D channel access scheme can include both a contention window 410 and a data transmission window 420. In one embodiment, in the contention window 410, each Tx UE can send a packet and/or transmit a specified sequence which is mapped to a cell identifier (CID) or a CID code of a selected Rx UE(s) to request D2D data communication.

In one embodiment, all CID codes can be communicated from the eNB simultaneously, because the CID codes are typically orthogonal or have low correlation with each other. In another embodiment, the CID codes can be sent in full power to enable nearby Rx UEs to receive the D2D data communication request.

In one embodiment, in the data transmission window 420, a Tx UE and an Rx UE can wake up at specified time for data communication. In one embodiment, the Tx UE transmits data packets in the allocated time-frequency channel using a specified transmit power for the specified duration, and the other Tx UEs and Rx UEs that are not allocated to transmit or receive data during the specified duration at that resource allocation may go into a sleep mode to save power until a specified duration arrives where the Tx UEs and/or Rx UEs are scheduled for transmitting or receiving data. In one embodiment, UEs not communicating data can be configured to wake up for the contention windows and return to sleep mode for the remained of the communication period.

In one embodiment, a Tx UE can contend for the channel in the contention window by sending a request signal and then listening for a response. If the Tx UE receives an approval for the request, i.e. resource(s) are allocated by an Rx UE for receiving data, the Tx UE can send data. In one example, the Tx UE can switch from a transmission mode to a reception mode and then from a reception mode to a transmission mode during the request procedure in order to transmit the request signal, receive an approval for the request, and transmit the data.

In one embodiment, the switches or turnaround time for a UE in a D2D system are greater than that of UE in a cellular system because of additional handshaking and contention that is used to allocate resources for transmitting and receiving data in a D2D communication. In one embodiment, switching of the hardware, such as from a transmission mode to a reception mode or from a reception mode to a transmission mode, can be approximately 10-20 micro second (μs) settlement time. In another embodiment, switching of the hardware, such as from a transmission mode to a reception mode or from a reception mode to a transmission mode, can use approximately 0.4-0.5 μs to flush out the memory. This can result in a propagation delay of the Tx UE and/or Rx UE. In one embodiment, a Tx UE may use approximately 22 μs for settlement time and propagation delay to switch over and be configured to receive an approval signal or data.

In one embodiment where the D2D system coexists with a cellular system or is adjacent to a cellular system, a subframe boundary of the cellular system can be used as a synchronization point for D2D communication during the uplink and/or downlink transmission of the cellular system. One advantage of synchronizing with the cellular system and using its subframe boundary is the D2D system avoids interference from the cellular system. In one embodiment, a subframe unit is the fundamental resource allocation unit of the cellular system. Resource allocation for the D2D network or D2D clusters can be allocated in sizes less than or equal to the cellular system subframe unit.

One advantage of allocating D2D network or D2D cluster resource to a size less than or equal to the cellular system subframe unit is to minimize or eliminate interference between the D2D system and the cellular system and/or nearby cellular systems. In one embodiment, nearby cellular systems can switch to a D2D zone synchronously at the subframe boundary of the cellular system so that low power and/or short range D2D communications are not interfered with by nearby strong uplink and/or downlink transmissions. In one embodiment, the D2D zone is a zone where the cellular system allocates a period of time where it does not send or receive data, leaving the communication band open for D2D communication.

In one embodiment, it can be desirable to maximize the reuse of a cellular transceiver for D2D communications. Maximizing the reuse of a cellular transceiver for D2D communications can reduce the cost and power consumption of D2D UEs. In one embodiment, the reuse of a cellular transceiver is maximized by reusing the symbol structure of a cellular system downlink or uplink transmission for a D2D communication. In one embodiment, reusing the symbol structure minimizes the changes to UE or system hardware, such as fast Fourier transform (FFT) and interleaver hardware.

Figure 5:
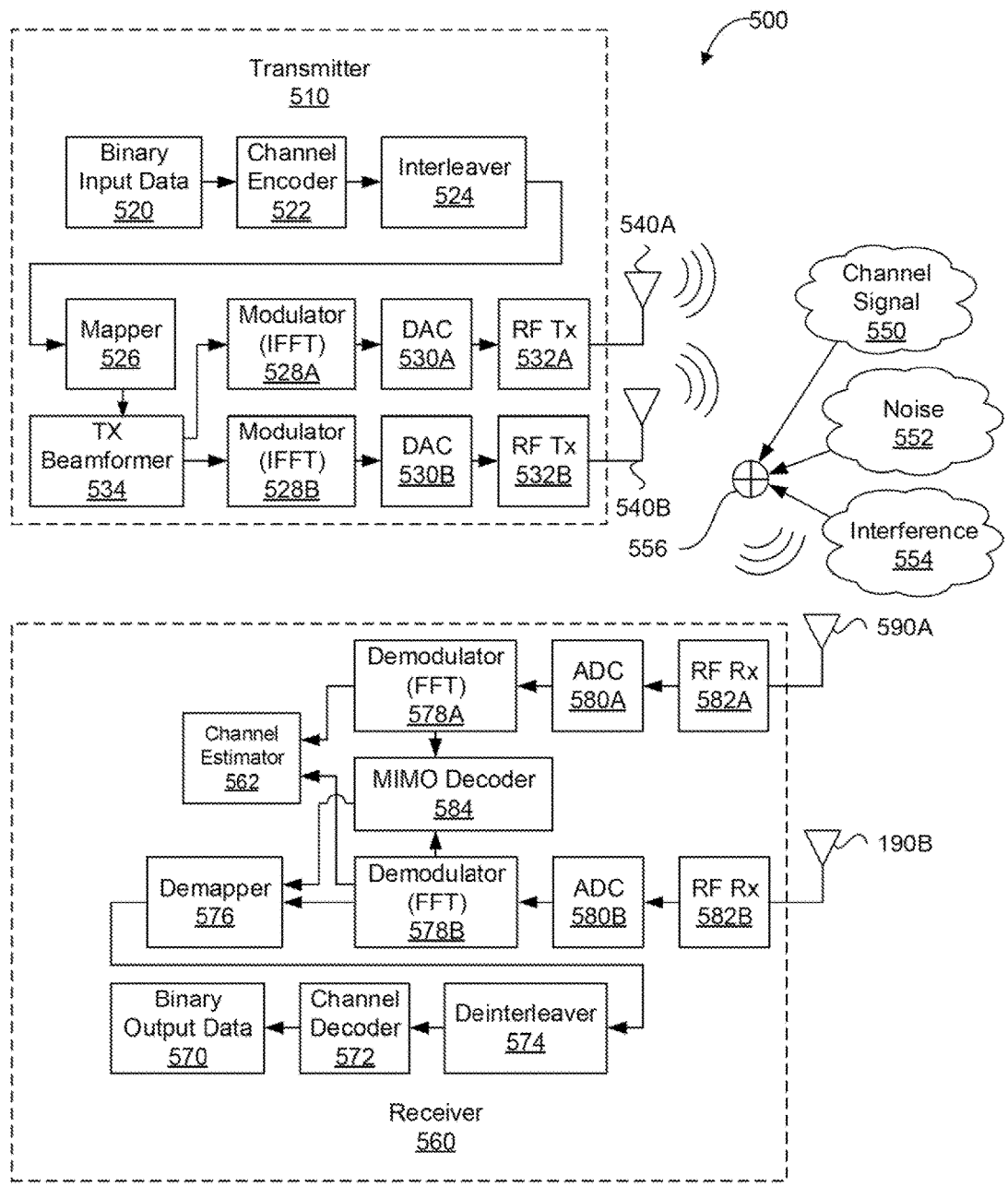
FIG. 5 illustrates an OFDM demodulator in accordance with an example.

FIG. 5 illustrates a receiver 520 with an OFDM demodulator 578A and 578B that includes an FFT demodulator used for receiving a downlink in a wireless device or UE. FIG. 5 also illustrates a transmitter 510 with an OFDM modulator 528A and 528B that includes an inverse fast Fourier transform (IFFT) modulator, in a transmitter used for transmitting an uplink to a cooperating node, such as an eNB. The timing of the FFT demodulator can be adjusted for the OFDM symbols using the timing synchronization with the cellular system.

A wireless communication system can be subdivided into various sections referred to as layers. In the LTE system, communication layers can include the physical (PHY), media access control (MAC), radio link control (RLC), packet data convergence protocol (PDCP), and radio resource control (RRC) layers. The physical layer can include the basic hardware transmission components of a wireless communication system 500, as illustrated in FIG. 5. A basic multiple-input multiple-output (MIMO) system is used for simplicity in illustrating the hardware transmission components. However, the components can also be adapted for a complex MIMO system, a single-input single-output (SISO) system, a multiple-input single-output (MISO) system, a single-input multiple-output (SIMO) system, or similar systems. For example in a MIMO system, at the transmitter 510, binary input data 520 can be protected through encoding using a channel encoder 522, interleaved against fading phenomenon using an interleaver 524, and mapped to improve reliability using a mapper 526. The mapped data can be separated into layers for antenna ports by a transmitting beamformer 534 and the layers can be OFDM modulated into OFDM symbols using modulators 528A-B. The modulators can use an inverse fast Fourier transform (IFFT) algorithm to compute the inverse discrete Fourier transform (IDFT) to generate modulated signals (vector x for each antenna port). The modulated signals can be converted to analog signals with digital-to-analog converters (DACs) 530A-B. The analog signals can be transmitted via radio frequency (RF) transmitters 532A-B configured to send the signal to transmitter antennas 540A-B operable to communicate the signal. The analog signals will follow a path referred to as a channel 550. The physical layer can include other components (not shown), such as series-to-parallel (S/P) converters, parallel-to-serial (P/S) converters, cyclic prefix (CP) inserters and deleters, guardband inserters and deleters, and other desired components.

The signal transmitted through a channel 550 can be subject to noise 552 and interference 554. The noise and interference is represented as an addition 556 to the channel signal, which can be received by receiver antennas 590A-B and one or more radio frequency (RF) receivers 582A-B at the receiver 560. The channel signal combined with the noise and interference can be converted to a digital modulated signal with analog-to-digital converters (ADCs) 580A-B. The digital signal can be OFDM demodulated using demodulators 578A-B. The demodulators can use a fast Fourier transform (FFT) algorithm to compute the discrete Fourier transform (DFT) to generate demodulated signals (vector y for each antenna port). A channel estimator 562 can use the demodulated signal to estimate the channel 550 and the noise and interference that occurs in the channel. The channel estimator can include a feedback generator or be in communication with the feedback generator, which can generate a physical uplink shared channel (PUSCH) feedback report, such as a channel quality indicator (CQI) report, a precoding matrix indicator (PMI) report, or a transmission rank indicator (RI) report. The CQI can be used to assist the MIMO transmissions modes. The demodulated signals can be combined using a MIMO decoder 584, demapped using a demapper 576, deinterleaved using a deinterleaver 574, and decoded by a channel decoder 572 to generate binary output data 570 that can be used by other layers of the receiving station.

Figure 6:
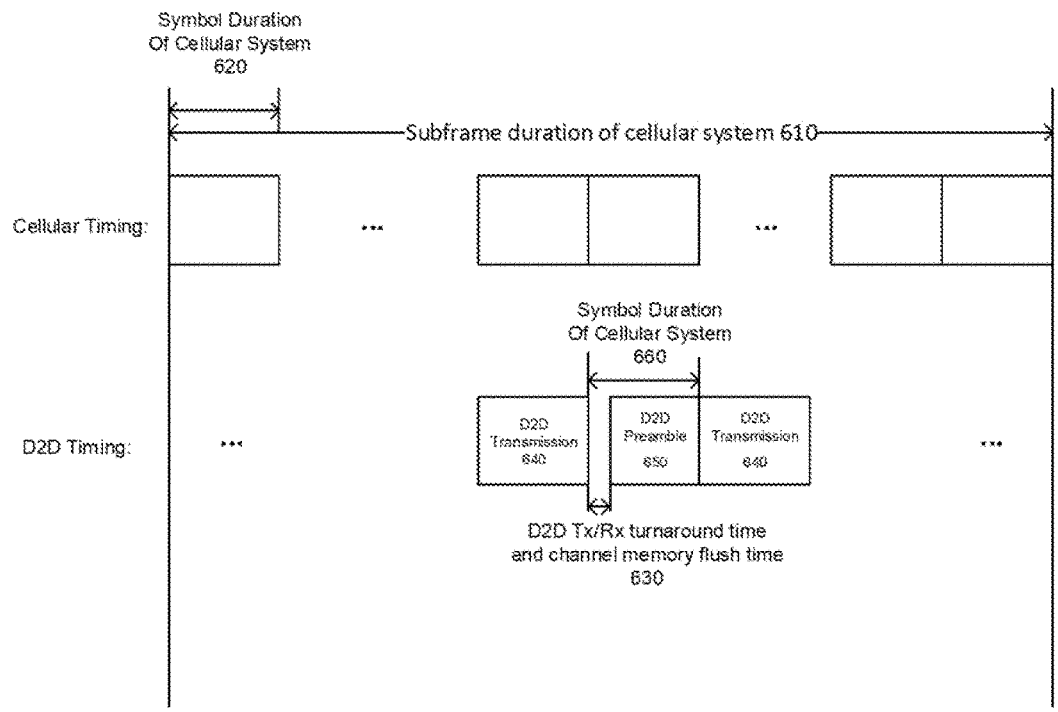
FIG. 6 illustrates the symbol boundary durations for a subframe duration of a cellular system in accordance with an example.

As discussed in the preceding paragraphs, the symbol duration of D2D can be the less than or equal to symbol duration of the cellular system, within a cyclic prefix interval. FIG. 6 illustrates the symbol boundary durations 620 for a subframe duration 610 of a cellular network and the synchronization of D2D transmissions to the cellular symbol boundaries. In one embodiment, for synchronizing D2D transmissions 640 to the cellular symbol boundary 620, the transmit to receive or receive to transmit turnaround period 630 of the Tx UE or Rx UE is located in a separate symbol duration interval 660, as shown in FIG. 6. In one embodiment, the remaining portion of the symbol duration interval 660 can be used to flush out the channel memory and/or send other signals, such as a preamble of the next data transmission for synchronization, automatic gain control (AGC), or channel training purpose. In one embodiment, the preamble of the D2D transmission can take approximately ½, ⅓, or ¼ of the symbol duration such that the density of the channel estimation is ½, ⅓, or ¼ of the data spectrum density. One advantage of using a portion of the symbol duration to transmit the preamble is that the data spectrum density and the reuse of cellular hardware for the FFT computation are maximized.

Figure 7:
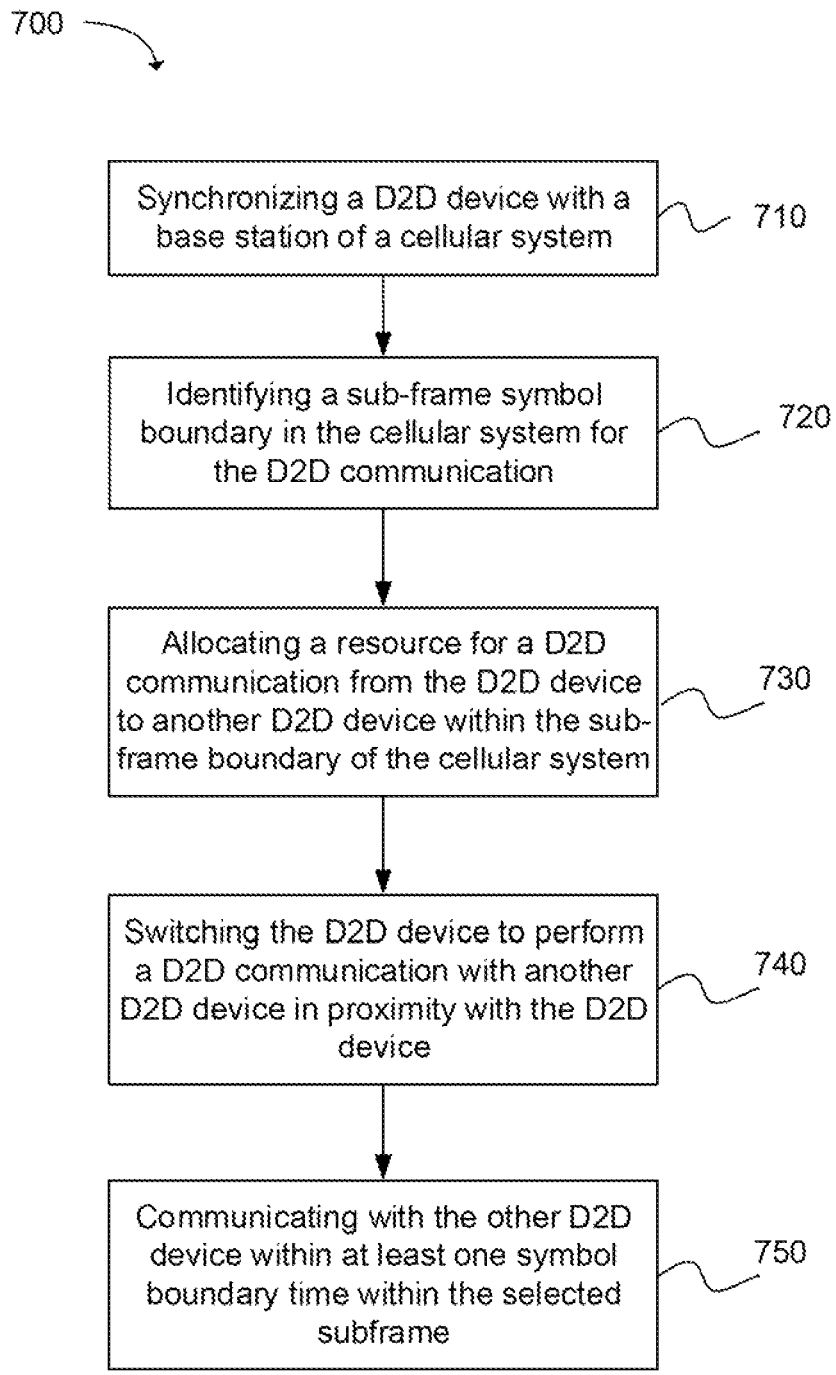
FIG. 7 illustrates a method for D2D communication scheduling in accordance with an example.

FIG. 7 provides a flow chart to illustrate a method 700 for D2D communication scheduling. The method comprises synchronizing a D2D device with a base station of a cellular system, as in block 710. In another embodiment, the method can further comprise synchronizing a D2D communication with another D2D device using a preamble of a D2D data transmission. The method can further comprise identifying a sub-frame symbol boundary in the cellular system for the D2D communication, as in block 720. The method can also comprise allocating a resource for a D2D communication from the D2D device to the other D2D device within the sub-frame boundary of the cellular system, as in block 730.

The method 700 can also comprise switching the D2D device to perform a D2D communication with the other D2D devices in proximity with the D2D device, wherein the other D2D device is substantially synchronized with the base station of the cellular system, as in block 740. The method can also comprise communicating with the other D2D device within at least one symbol boundary time within the selected subframe, as in block 750. In one embodiment, the communication with the other D2D device occurs in a time period that is less than a symbol boundary duration of the cellular system. In one embodiment, the method can further comprise communicating a D2D zone synchronization request from the D2D device to the cellular system.

Figure 8:
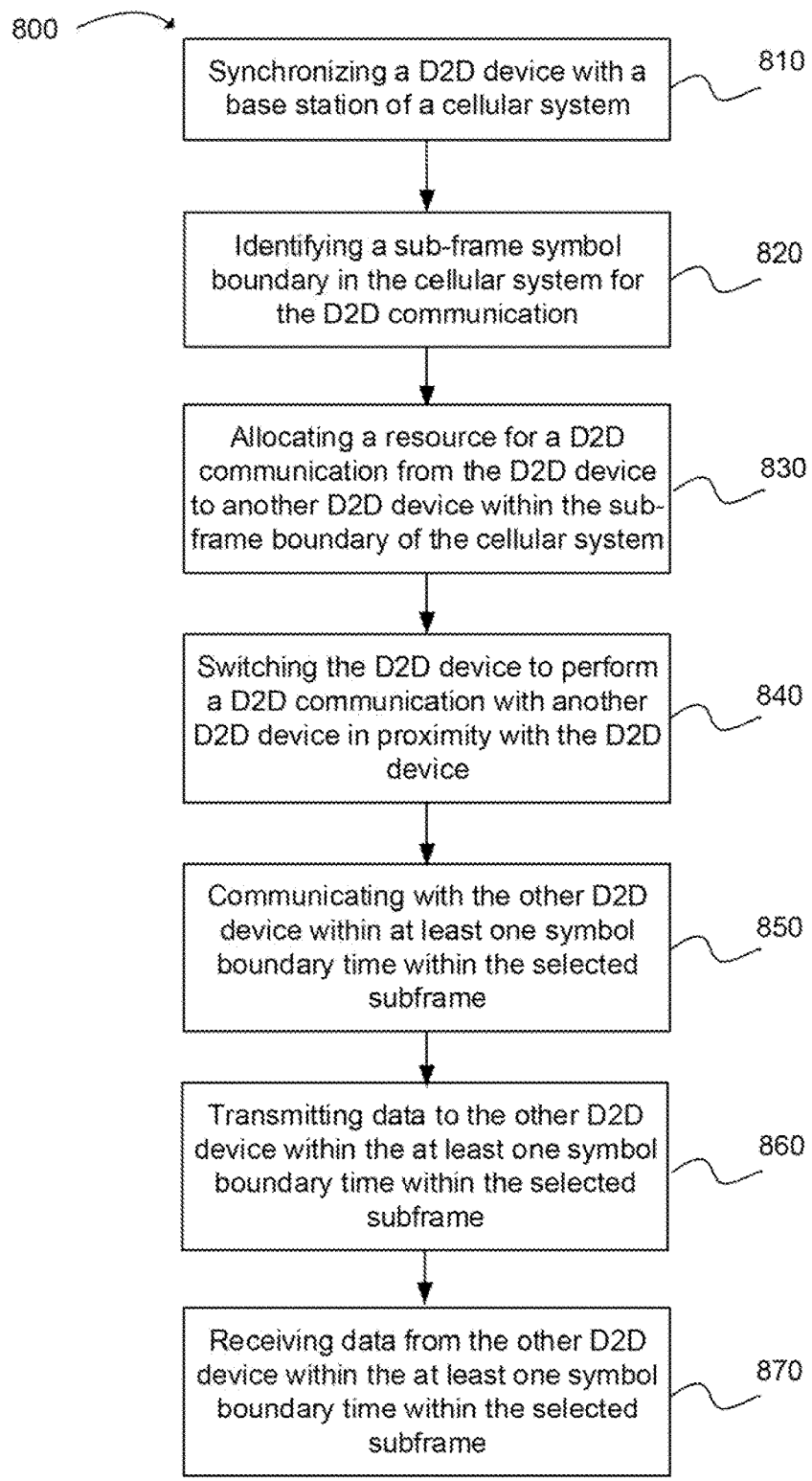
FIG. 8 illustrates another method for D2D communication scheduling in accordance with an example.

FIG. 8 uses a flow chart to illustrate a method 800 for D2D communication scheduling substantially similar to the method 700 described in FIG. 7. In addition to the method 700 illustrated in FIG. 7, The method 800 in FIG. 8 can further comprise transmitting data to the other D2D device within the at least one symbol boundary time within the selected subframe, as in block 860. The method can further comprise receiving data from the other D2D device within the at least one symbol boundary time within the selected subframe, as in block 870. In one embodiment, the method can further comprise using enhanced inter-cell interference coordination (eICIC) to transmit or receive the data.

Figure 9:
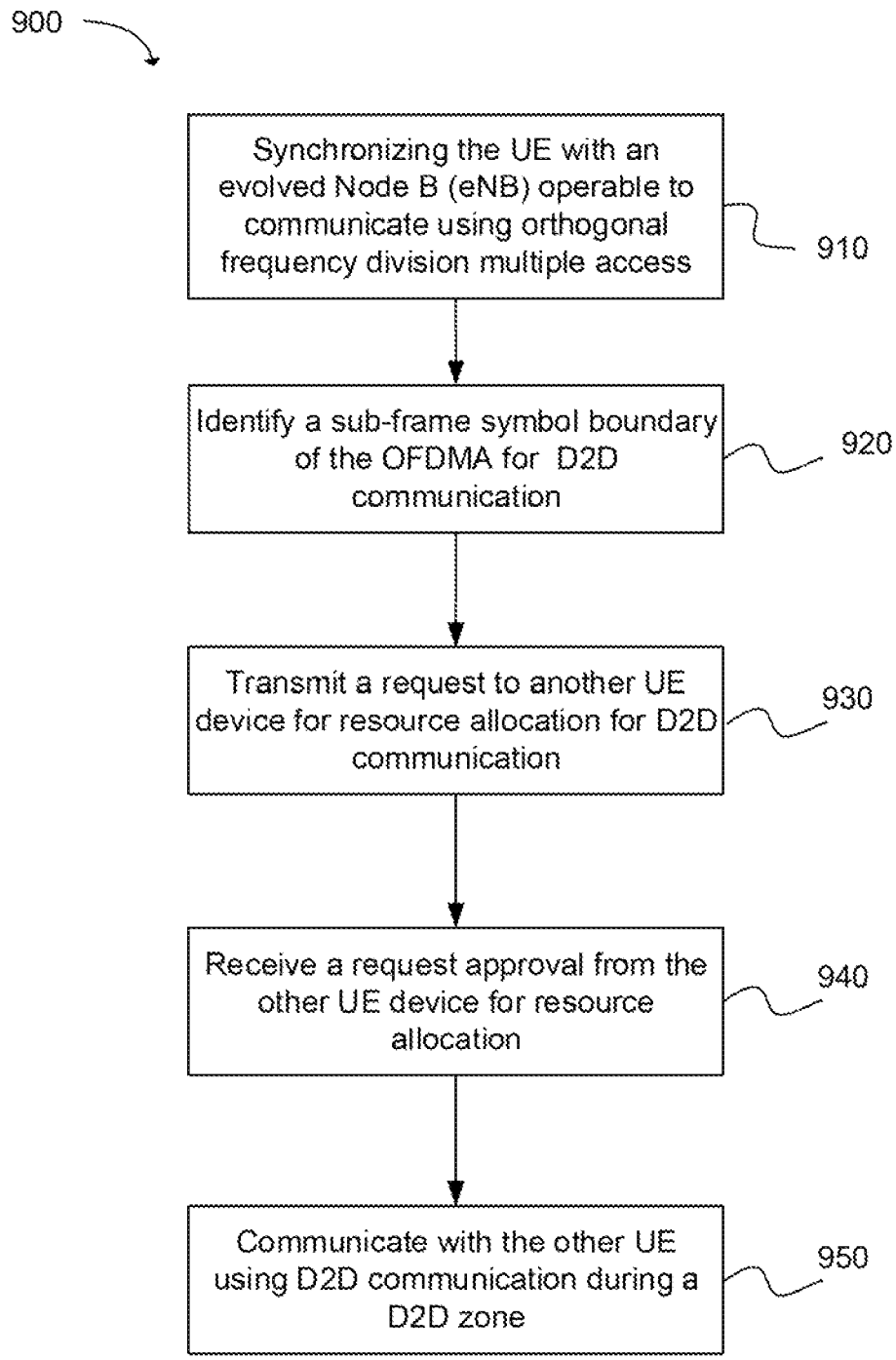
FIG. 9 depicts the functionality of the computer circuitry of a user equipment (UE) operable to communicate in a D2D network in accordance with an example.

Another example provides functionality 900 of computer circuitry of a UE operable to communicate in a D2D network, as shown in the flow chart in FIG. 9. The functionality can be implemented as a method or the functionality can be executed as instructions on a machine, where the instructions are included on at least one computer readable medium or one non-transitory machine readable storage medium. The computer circuitry can be configured for synchronizing the UE with an eNB operable to communicate using orthogonal frequency division multiple access (OFDMA), as in block 910. The computer circuitry can be further configured to identify a sub-frame symbol boundary of the OFDMA for D2D communication, as in block 920. The computer circuitry can also be configured to transmit a request to another UE device for resource allocation for D2D communication, as in block 930. The computer circuitry can also be configured to receive a request approval from the other UE device for resource allocation, as in block 940. The computer circuitry can also be configured to communicate with the other UE using D2D communication within a D2D zone, wherein the communication occurs synchronously at a subframe boundary, as in block 950. In another embodiment, the computer circuitry can be further configured to transmit and receive data within a symbol duration of the OFDMA. In another embodiment, the computer circuitry can also be configured to transmit and receive data during a downlink or uplink subframe. In another embodiment, the computer circuitry can also be configured for spatial reuse of UE communications, wherein the spatial reuse enables non-interfering spatially-separate transmitting and receiving of data during D2D communications.

Figure 10:
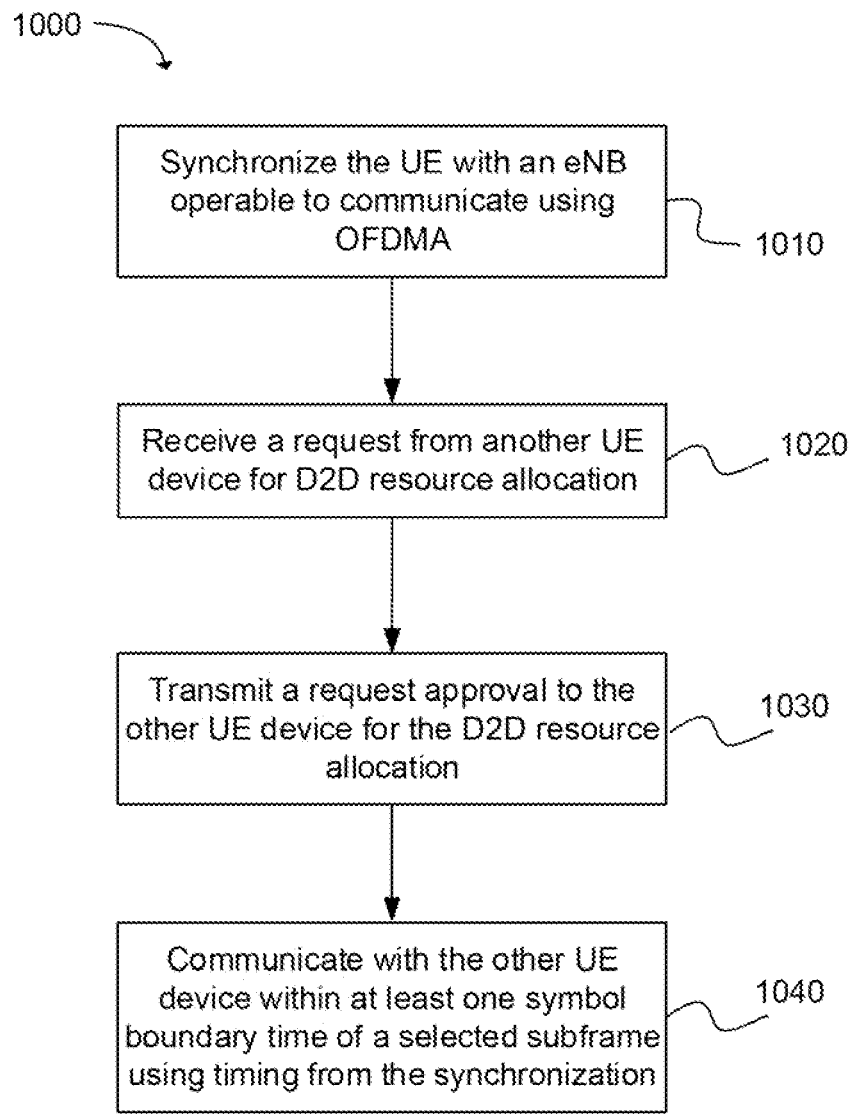
FIG. 10 depicts the functionality of the computer circuitry of another UE operable to communicate in a D2D network in accordance with an example.

Another example provides functionality 1000 of computer circuitry of a UE operable to communicate in a D2D network, as shown in the flow chart in FIG. 10. The functionality can be implemented as a method or the functionality can be executed as instructions on a machine, where the instructions are included on at least one computer readable medium or one non-transitory machine readable storage medium. The computer circuitry can be configured for synchronizing the UE with an eNB operable to communicate using OFDMA, as in block 1010. The computer circuitry can be further configured to receive a request from another UE device for D2D resource allocation, as in block 1020. The computer circuitry can also be configured to transmit a request approval to the other UE device for the D2D resource allocation, as in block 1030. The computer circuitry can also be configured to communicate with the other UE device within at least one symbol boundary time of a selected subframe using timing from the synchronization, as in block 1040. In another embodiment, the computer circuitry can be further configured to transmit and receive data within a symbol duration of the OFDMA. In another embodiment, the computer circuitry can also be configured to transmit and receive data within a cyclic prefix interval. In another embodiment, the computer circuitry can be further configured to send a D2D communication preamble prior to sending a D2D transmission. In one embodiment, the D2D communication preamble comprises a D2D communication preamble for subsequent data transmission, AGC data, or a channel training data. In another embodiment, the computer circuitry is further configured to align the transmission and reception of data using the D2D communication preamble. In another embodiment, computer circuitry is further configured to re-synchronize the transmission and reception of data using the communication preamble.

Figure 11:
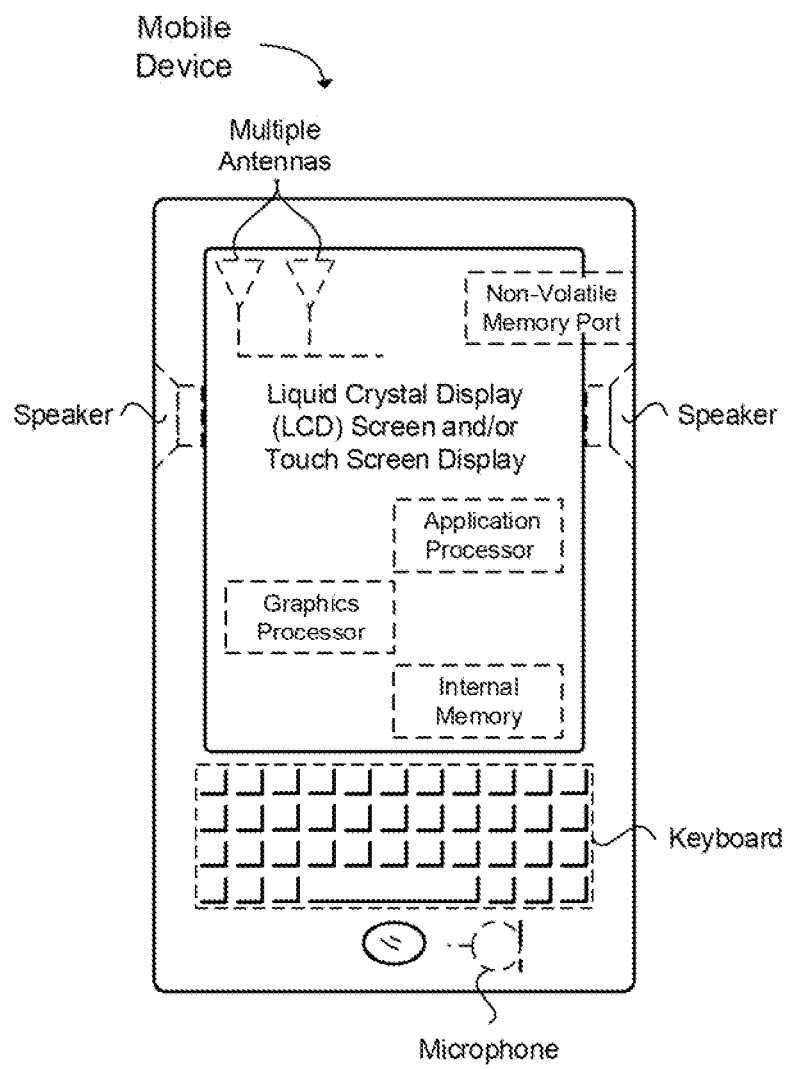
FIG. 11 illustrates a diagram of a UE in accordance with an example.

FIG. 11 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 11 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for device to device (D2D) communication scheduling, comprising:
   synchronizing a D2D device with a base station of a cellular system;
   identifying a sub-frame symbol boundary in the cellular system for the D2D communication;
   allocating a resource for a D2D communication from the D2D device to another D2D device within the sub-frame boundary of the cellular system;
   switching the D2D device to perform a D2D communication with another D2D device in proximity with the D2D device, wherein the other D2D device is substantially synchronized with the base station of the cellular system; and
   communicating with the other D2D device within at least one symbol boundary time within the selected subframe, wherein communicating with the other D2D device occurs in a time period that is less than a symbol boundary duration of the cellular system.

2. The method of claim 1, wherein communicating with the other D2D device further comprises:
   transmitting data to the other D2D device within the at least one symbol boundary time within the selected subframe; or
   receiving data from the other D2D device within the at least one symbol boundary time within the selected subframe.

3. The method of claim 2, wherein the method further comprises using enhanced inter-cell interference coordination (eICIC) to transmit or receive the data.

4. The method of claim 1, the method further comprising communicating a D2D zone synchronization request from the D2D device to the cellular system.

5. The method of claim 1, the method further comprising synchronizing a D2D communication with the other D2D device using a preamble of a D2D data transmission.

6. A user equipment (UE) operable to communicate in a device to device (D2D) network, the UE having computer circuitry configured to:
   synchronize the UE with an evolved Node B (eNB) operable to communicate using orthogonal frequency division multiple access (OFDMA);
   identify a sub-frame symbol boundary of the OFDMA for D2D communication;
   transmit a request to another UE device for resource allocation for D2D communication;
   receive a request approval from the other UE device for resource allocation; and
   communicate with the other UE using D2D communication during a D2D zone, wherein the communication occurs synchronously at a subframe boundary, wherein communicating with the other UE device occurs in a time period that is less than a symbol boundary duration of the cellular system.

7. The computer circuitry of claim 6, wherein the computer circuitry is further configured to transmit and receive data within a symbol duration of the OFDMA.

8. The computer circuitry of claim 6, wherein the computer circuitry is further configured to transmit and receive data during a downlink or uplink subframe.

9. The computer circuitry of claim 6, wherein the computer circuitry is further configured for spatial reuse of UE communications.

10. The computer circuitry of claim 9, wherein the spatial reuse enables non-interfering spatially-separate transmitting and receiving of data during D2D communications.

11. A user equipment (UE) operable to communicate in a device to device (D2D) network, having computer circuitry configured to:
   synchronize the UE with an evolved Node B (eNB) operable to communicate using orthogonal frequency division multiple access (OFDMA);
   receive a request from another UE device for D2D resource allocation;
   transmit a request approval to the other UE device for the D2D resource allocation; and
   communicate with the other UE device within at least one symbol boundary time of a selected subframe using timing from the synchronization, wherein communicating with the other UE device occurs in a time period that is less than a symbol boundary duration of the cellular system.

12. The computer circuitry of claim 11, wherein the computer circuitry is further configured to transmit and receive data within a symbol duration of the OFDMA.

13. The computer circuitry of claim 12, wherein the computer circuitry is further configured to transmit and receive data within a cyclic prefix interval.

14. The computer circuitry of claim 12, wherein the computer circuitry is further configured to allocate at least a portion of a symbol duration for a D2D communication preamble, a turnaround time, and a channel memory flush time.

15. The computer circuitry of claim 14, wherein the computer circuitry allocates at least half of the symbol duration for the D2D communication preamble.

16. The computer circuitry of claim 12, wherein the computer circuitry is further configured to send a D2D communication preamble prior to sending a D2D transmission.

17. The computer circuitry of claim 16, wherein the D2D communication preamble comprises a D2D communication preamble for subsequent data transmission, automatic gain control data, or a channel training data.

18. The computer circuitry of claim 16, wherein the computer circuitry is further configured to align the transmission and reception of data using the D2D communication preamble.

19. The computer circuitry of claim 16, wherein the computer circuitry is further configured to re-synchronize the transmission and reception of data using the communication preamble.

20. A user equipment (UE) operable to communicate in an infrastructure mode in a device to device (D2D) network, the UE having computer circuitry configured to:
   synchronize the UE with an evolved Node B (eNB) operable to communicate using orthogonal frequency division multiple access (OFDMA);
   identify a sub-frame symbol boundary of the OFDMA for D2D communication;
   transmit a request to the eNB for resource allocation for D2D communication; and
   communicate with the other UE using D2D communication during a D2D zone, wherein the communication occurs synchronously at a subframe boundary, wherein communicating with the other UE device occurs in a time period that is less than a symbol boundary duration of the cellular system.

21. The computer circuitry of claim 20, wherein the computer circuitry is further configured to transmit and receive data within a symbol duration of the OFDMA.

* * * * *